Figure 3:
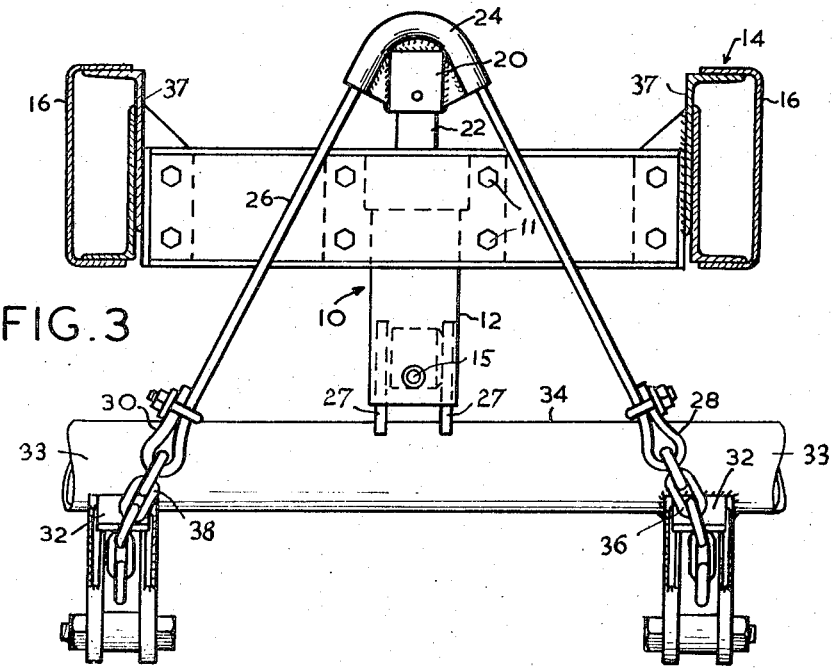

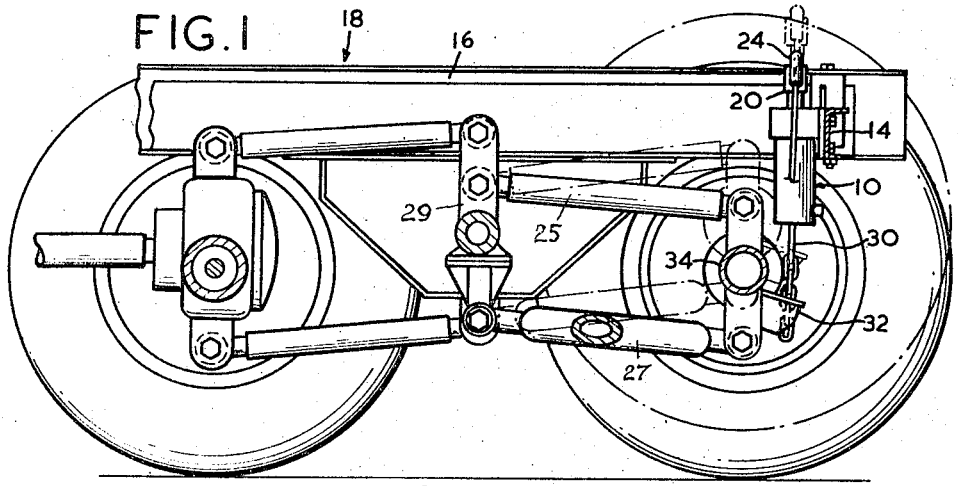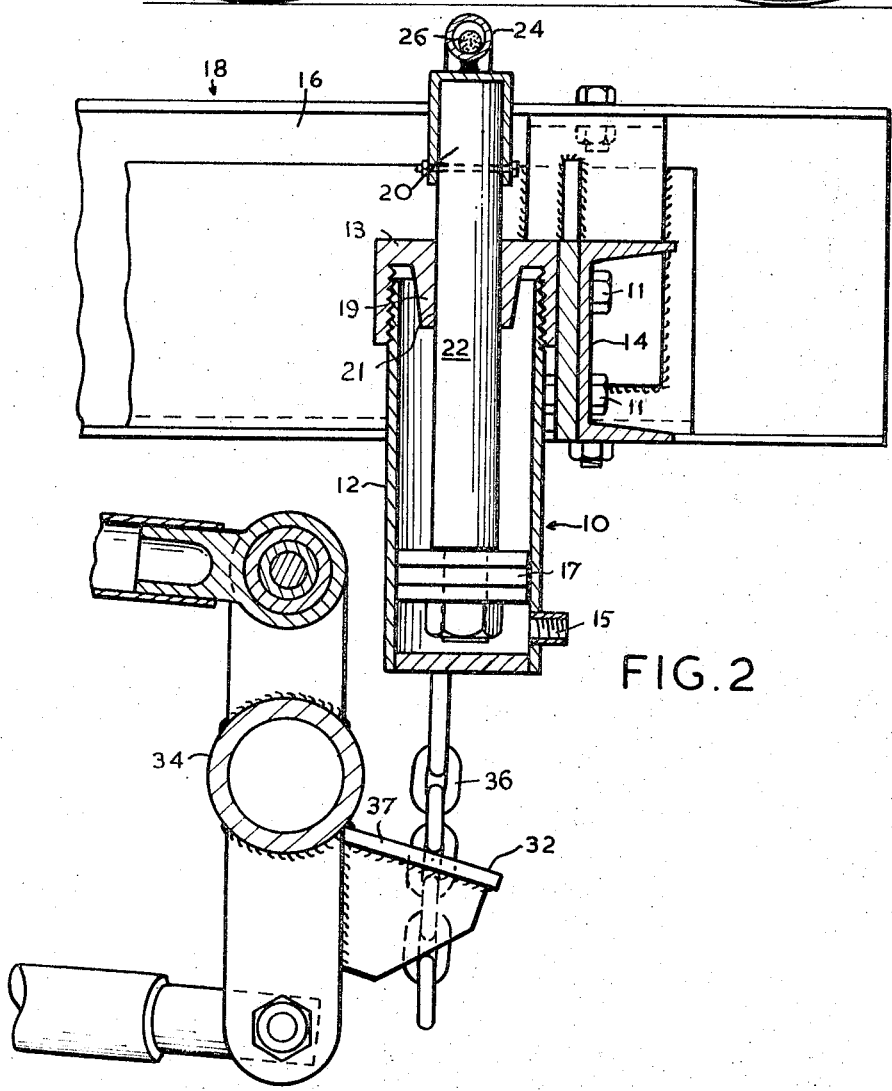

Sept. 12, 1967 R. F. WHITEHEAD 3,340,946
VEHICLE LOAD-TRANSFER SUSPENSIONS
Filed Aug. 6, 1965 2 Sheets-Sheet 2

United States Patent Office 3,340,946
Patented Sept. 12, 1967

3,340,946
VEHICLE LOAD-TRANSFER SUSPENSIONS
Robert Frederick Whitehead, 56 Boundary Road, Chester
Hill, near Sydney, New South Wales, Australia
Filed Aug. 6, 1965, Ser. No. 477,980
Claims priority, application Australia, Aug. 7, 1964,
47,892/64
2 Claims. (Cl. 180—22)

This invention has reference to heavy six-wheeled trucks, tipping trucks and like road vehicles and, more particularly, to those provided with a four-wheeled bogie, swivelling truck or the like which, for instance, may be of the type described in my co-pending application No. 477,979. The four-wheeled bogie comprises a driving axle, and a trailing axle arranged at a distance behind said driving axle.

The object of the present invention is to provide on the vehicle lifting means by the operation of which the load can temporarily be taken off the rear or trailing axle of the bogie and be transferred to the driving axle if it is desired to obtain an increased grip of the driving wheels on the ground, for instance if the vehicle is bogged or is similarly impeded during travel.

Road vehicles of the type referred to above have a chassis which comprises longtiudinal side members and transverse members, one of said transverse members being arranged substantially at the rear of the chassis. The load transfer device according to the invention for use on such a vehicle comprises a ram or similar expandable power unit mounted in upright position on such a transverse member at, or near, the rear of the vehicle chassis, said ram having a first part which is secured to said transverse member, and another part which is vertically displaceable relative to said first part if power is supplied to the ram, and tension means secured, on the one hand, to the top portion or head of said vertically displaceable part and, on the other hand, to mutually spaced elements connected with said trailing axle.

Preferably the ram is either a hydraulic ram or a pneumatic ram although, alternatively, it may be designed as an electro-magnetic device, the exciter current of which may, for instance, be supplied from a dynamo when the latter is connected to a suitable take-off of the vehicle engine or motor, or from another source of electricity.

For the sake of simplicity reference will be made in the following only to a ram, which may be either of the hydraulic or of the pneumatic type.

In a preferred embodiment the head of the vertically displaceable part or plunger of the ram is provided with means for holding and guiding the middle of a cable or the like which serves as the above mentioned tension member, the opposite ends of said cable being properly secured at mutually spaced points either directly, or indirectly, to the rear or trailing axle of the bogie.

If the plunger of the ram is raised, the trailing axle of the bogie is raised relative to the chassis of the vehicle by the pull exerted thereon through the said cable, so that the rear wheels of the bogie are made to clear the ground. The part of the vehicle weight normally taken by the rear wheels is transferred entirely upon the driving wheels and even a part of the normal load on the front wheels is thrown upon the driving wheels. With this temporary re-distribution of the load over the vehicle wheels a considerable increase of the friction of the driving wheels with the ground and, consequently, an increased driving moment is obtained, which renders it possible to overcome a resistance to the driving of the vehicle, which cannot normally be handled by the vehicle under its own power, without outside help, i.e. without reliance on aids extraneous to the vehicle itself.

Figure 4:
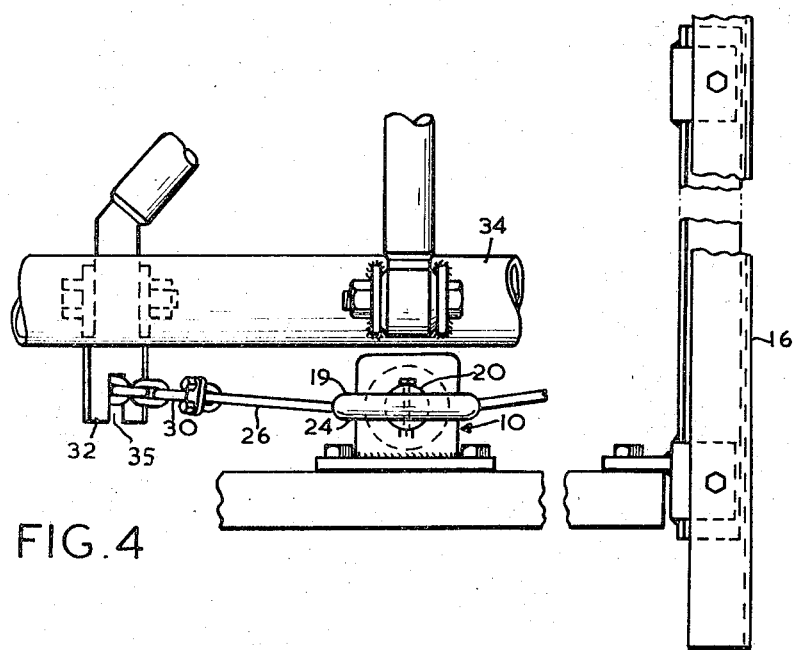

In order to more particularly describe the invention, reference is made to the accompanying drawings which, by way of example only, illlustrate a specific embodiment of the load transfer device, and wherein:

FIG. 1 is a longitudinal section through the rear of a vehicle fitted with the load transfer device and through the four-wheeled bogie with the rear or trailing axle and wheels illustrated in their normal and in raised position, FIG. 2 is a sectional view of the ram illustrating its connection with the trailing axle of the bogie, FIG. 3 is an end view illustrating the arrangement of the load transfer device on the chassis and its connection with the trailing axle, and FIG. 4 is a fragmentary plan view to FIG. 3.

In the embodiment shown the load transfer device includes a hydraulic ram 10 the cylinder 12 of which is detachably secured in an upright position, by bolts 11, to a cross-beam 14 arranged at, or near, the rear of the chassis 16 of a vehicle 18, midway between the outer frame portions or sides 17 of the chassis.

The cylinder 12 is provided in its bottom portion with a socket 15 through which a pressure fluid can be admitted from a supply through a hose connection and valve means, whenever required for the operation of the device. The supply for the pressure fluid, the valve means and the hose connection are not shown in the drawings.

At its lower end the plunger carries a piston 17. The plunger passes a gland 19 in the top portion 13 of the cylinder 12, and at its outer and upper end the plunger carries a head 20 suitably secured thereto, for instance by welding.

A guide 24 for a steel cable 26 is mounted on the head 20. The opposite cable ends 28 and 30, respectively, are secured, e.g. in the manner described below, to lugs 32 or like elements arranged in mutually spaced relationship on, and properly fastened to, the rear or trailing axle 34 of a bogie which may be designed as described in my copending application No. 477,979, or to some element rigidly associated with said axle. Preferably the lugs 32 are arranged near the outer ends 33 of the trailing axle 34. Connection of the steel cable 26 with these lugs 32 may be effected by links of chains 36 and 38, respectively, the chains being of adequate strength and being attached to the ends 28 and 30 of the cable which for that purpose may be looped as shown. Fixation of the chains to the lugs 32 is effected by slipping a link of each chain into a slot 35 formed in a plate-like element 37 forming a part of each lug 32.

For operation of the device, pressure fluid is admitted to the cylinder 12 of the ram from the said supply for the fluid through the socket 15 after actuation of the aforementioned valve means. The fluid entering the cylinder forces the piston 17 and the plunger 22 upward in the cylinder 12 until the upper surface of the piston touches, or at least approaches, the lower end 21 of the gland 19. The upward movement of the plunger, together with the guide 24 on its head 20 and the steel cable 26, causes the trailing axle to be lifted off the ground, to the position shown in chain lines in FIG. 1. During the upward movement the trailing axle is guided by resilient links 25 and 27 which connect said axle with another part or central fixed member 29 of the bogie structure.

The trailing axle 34 remains in the raised position as long as the fluid pressure is maintained within the cylinder 12 of the ram 10. For returning the trailing axle to its normal position it is only necessary to reduce the pressure in the cylinder 12 in any manner known to experts in the field of hydraulic equipment.

The operation is the same in principle if a pneumatic pressure medium is used in the device, instead of a liquid pressure fluid.

If the device is used on a tipping truck or on some other vehicle equipped with hydraulic gear, the operation of the ram 10 may be effected from the pressure medium of that gear, via a directional valve and/or a control valve, with or without an additional pressure relief valve. Alternatively, it is possible to use a special pump or compressor for producing the fluid pressure required for the operation of the raising means according to this invention.

I desire it to be understood that I do not wish protection by Letters Patent to be limited to the above described details, as these are capable of further modification within the scope and ambit of the appended claims.

Thus, for instance, two cables, ropes or chains arranged at the opposite sides of the ram may be used in lieu of a single cable passed through or over a cable guide. The fixation of the cable, rope, chain or like means to the trailing axle may likewise be adapted to particular requirements.

I claim:

1. A vehicle construction comprising, a frame having a fixed cross frame member, a four wheeled bogie suspended from said frame including a central fixed member, a wheeled driving rear axle linked to said fixed member and a wheeled trailing axle linked to said central fixed member, said trailing axle having a lug extending outwardly from each end thereof, a fluid cylinder affixed centrally to said fixed cross frame member and supported in a substantially vertical position, a fluid piston slidable in said cylinder having a piston rod portion extending upwardly from said cylinder, a cable guide defining a curved cable confining groove supported adjacent the upper end of said piston rod portion, a cable engaged in said guide and having respective ends extending downwardly from said guide and into engagement with a respective lug at each end of said trailing axle, and means for admitting fluid under pressure to said fluid cylinder to force said piston with said piston rod portion upwardly to cause said cable to move upwardly with said trailing axle to unload said trailing axle from a load bearing position, said lugs each having a slot therein opening at the outer end of said lug, and a link chain connected to each end of said cable and having a link passed through said slot to anchor said chain with said cable to the respective lug.

2. A vehicle construction comprising, a frame having a fixed cross frame member, a four wheeled bogie suspended from said frame including a central fixed member a wheeled driving rear axle, a wheeled trailing axle, each of said rear axle and said trailing axle having a link rigidly connected thereto and extending upwardly and downwardly therefrom, a first resilient link member having an end pivotally connected to said central fixed member adjacent the upper end thereof and having an opposite end pivotally connected to said link above said trailing axle, a second resilient link member having one end pivotally connected to said central fixed member adjacent the lower end thereof and having an opposite end pivotally connected to said link of said trailing axle below said trailing axle, a third link member having one end pivotally connected to said central fixed member adjacent the upper end thereof and an opposite end pivotally connected to said link of said rear axle above said rear axle, a fourth link member having one end pivotally connected to said central fixed member adjacent the lower end thereof and having an opposite end pivotally connected to the link of said rear axle below said rear axle, said trailing axle having a lug extending outwardly from each end thereof, a fluid cylinder affixed centrally to said fixed cross frame member and supported in a substantially vertical position, a fluid piston slidable in said cylinder having a piston rod portion extending upwardly from said cylinder, a cable guide defining a curved cable confining groove supported adajacent the upper end of said piston rod portion, a cable engaged in said guide and having respective ends extending downwardly from said guide and into engagement with a respective lug at each end of said trailing axle, and means for admitting fluid under pressure to said fluid cylinder to force said piston with said piston rod portion upwardly to cause said cable to move upwardly with said trailing axle to unload said trailing axle from a load bearing position.

References Cited

UNITED STATES PATENTS

| | | | |
|---|---|---|---|
| 2,599,043 | 7/1952 | Bissel | 180—22 |
| 2,712,856 | 7/1955 | MacPhee | 180—22 |
| 2,777,529 | 1/1957 | Harbers | 180—22 |

FOREIGN PATENTS

| | | |
|---|---|---|
| 209,439 | 7/1957 | Australia. |
| 568,630 | 11/1957 | Italy. |

A. HARRY LEVY, *Primary Examiner.*